United States Patent
Yang et al.

(10) Patent No.: US 12,415,279 B2
(45) Date of Patent: Sep. 16, 2025

(54) METHOD FOR CONTROLLING UNDERWATER ROBOT, UNDERWATER ROBOT AND STORAGE MEDIUM

(71) Applicant: SHENZHEN QYSEA TECH CO., LTD, Shenzhen (CN)

(72) Inventors: Songhe Yang, Shenzhen (CN); Junjie Huang, Shenzhen (CN); Choju Chung, Shenzhen (CN); Chong Zhang, Shenzhen (CN)

(73) Assignee: SHENZHEN QYSEA TECH CO., LTD., Shenzhen (CN)

( * ) Notice: Subject to any disclaimer, the term of this patent is extended or adjusted under 35 U.S.C. 154(b) by 202 days.

(21) Appl. No.: 18/329,751

(22) Filed: Jun. 6, 2023

(65) Prior Publication Data
US 2024/0383147 A1 Nov. 21, 2024

(30) Foreign Application Priority Data
May 17, 2023 (CN) .......................... 202310565120.5

(51) Int. Cl.
*B25J 9/16* (2006.01)
*B25J 13/08* (2006.01)
*B63C 11/52* (2006.01)

(52) U.S. Cl.
CPC ........... *B25J 9/1697* (2013.01); *B25J 13/089* (2013.01); *B63C 11/52* (2013.01)

(58) Field of Classification Search
CPC ....... B25J 9/1697; B25J 13/089; B63C 11/52; G05D 1/0206
See application file for complete search history.

(56) References Cited

U.S. PATENT DOCUMENTS

| 9,215,383 B2* | 12/2015 | Milnes | H04N 5/272 |
| 10,643,346 B2* | 5/2020 | Huber | B64U 10/25 |
| 2005/0131582 A1* | 6/2005 | Kazi | B25J 9/1697 |
| | | | 700/259 |

(Continued)

FOREIGN PATENT DOCUMENTS

| CN | 108415441 A | 8/2018 |
| CN | 111480407 A | 8/2020 |

(Continued)

OTHER PUBLICATIONS

First Office Action issued in counterpart Chinese Patent Application No. 202310565120.5, dated Jun. 13, 2024.

(Continued)

*Primary Examiner* — Adam R Mott
*Assistant Examiner* — Sagar Kc
(74) *Attorney, Agent, or Firm* — Westbridge IP LLC

(57) ABSTRACT

Disclosed are a method for controlling an underwater robot, an underwater robot and a storage medium. The method includes: in response to switching a display visual angle of a control terminal, determining an orientation of a current display visual angle relative to a controlled underwater robot; determining a current control coordinate system of the underwater robot according to the orientation, a main direction of the control coordinate system is consistent with the orientation; and controlling the underwater robot based on a received control instruction and the control coordinate system.

10 Claims, 5 Drawing Sheets

(56) References Cited

U.S. PATENT DOCUMENTS

| | | | |
|---|---|---|---|
| 2012/0221145 A1* | 8/2012 | Ogawa | B25J 13/02 700/254 |
| 2015/0142171 A1* | 5/2015 | Li | B25J 9/1692 700/251 |
| 2016/0139595 A1* | 5/2016 | Yang | G05D 1/102 701/2 |
| 2017/0330467 A1* | 11/2017 | Umetani | G01S 19/15 |
| 2019/0197335 A1 | 6/2019 | Zhang et al. | |
| 2021/0245081 A1* | 8/2021 | Kumar | G05D 1/225 |
| 2022/0187841 A1* | 6/2022 | Ebrahimi Afrouzi | G05D 1/0274 |
| 2023/0227182 A1* | 7/2023 | Kimber | B64C 33/02 244/22 |
| 2023/0234718 A1* | 7/2023 | Masefield | B64C 5/02 701/3 |

FOREIGN PATENT DOCUMENTS

| | | | |
|---|---|---|---|
| CN | 114842056 A | | 8/2022 |
| JP | 2000079587 A | | 3/2000 |
| JP | 2008016058 A | * | 1/2008 |
| JP | 2017151499 A | | 8/2017 |

OTHER PUBLICATIONS

Notification to Grant Patent Right for Invention issued in counterpart Chinese Patent Application No. 202310565120.5, dated Jul. 1, 2024.

* cited by examiner

METHOD FOR CONTROLLING UNDERWATER ROBOT, UNDERWATER ROBOT AND STORAGE MEDIUM

CROSS-REFERENCE TO RELATED APPLICATIONS

This application claims priority to Chinese Patent Application No. 202310565120.5, filed on May 17, 2023, the entire contents of which is incorporated herein by reference.

TECHNICAL FIELD

The present disclosure relates to the technical field of underwater operations, and in particular to a method for controlling an underwater robot, an underwater robot and a storage medium.

BACKGROUND

When the underwater robot is working underwater, the movement of the underwater robot is generally operated through the control terminal. The forward and backward speed of the underwater robot is fast, while the left and right translation speed is slow. Therefore, in an environment with a large water flow, the forward direction of the underwater robot will be selected for anti-flow operations, and the machine needs to be frequently operated to adapt to changes in the water flow.

In related underwater robot control solutions, the underwater robot is generally controlled from a first-person perspective based on the data captured by the main camera installed in front of the underwater robot. However, since the operator will switch cameras when observing the target on the side of the underwater robot, the image of the display visual angle is not the data captured by the main camera. Especially in the anti-flow operation scene, it will be more difficult to operate the underwater robot, thus the misoperation occurs, and the working efficiency is reduced.

The above contents are only used to assist in understanding the technical solution of the present disclosure, and does not submit that the above contents are prior art.

SUMMARY

The main objective of the present disclosure is to provide a method for controlling an underwater robot, an underwater robot and a computer readable storage medium, aiming at reducing the difficulty of operating the underwater robot.

In order to achieve the above objective, the present disclosure provides a method for controlling an underwater robot, including:
in response to switching a display visual angle of a control terminal, determining an orientation of a current display visual angle relative to a controlled underwater robot;
determining a current control coordinate system of the underwater robot according to the orientation, wherein a main direction of the control coordinate system is consistent with the orientation; and
controlling the underwater robot based on a received control instruction and the control coordinate system.

In an embodiment, the operation of determining an orientation of a current display visual angle relative to a controlled underwater robot includes:
determining a camera corresponding to the current display visual angle;
if the camera is fixedly installed, obtaining an installation position of the camera on the underwater robot; and
determining the orientation according to the installation position.

In an embodiment, the operation of determining the orientation of the current display visual angle relative to the controlled underwater robot includes:
determining a camera corresponding to the current display visual angle;
if the camera is installed on a support assembly, obtaining an angle information of the support assembly; and
determining the orientation according to the angle information.

In an embodiment, the operation of determining the current control coordinate system of the underwater robot according to the orientation includes:
determining a display mode corresponding to the current display visual angle;
adjusting a body posture of the underwater robot according to the display mode; and
determining the control coordinate system according to the body posture and the orientation.

In an embodiment, the operation of controlling the underwater robot based on the received control instruction and the control coordinate system includes:
in response to receiving a target locking instruction, determining a forward distance between the underwater robot and a tracking target according to the target locking instruction;
determining a target position of a movement of the underwater robot according to the control coordinate system and the control instruction;
in response to that a distance between the target position and the tracking target is greater than the forward distance, controlling the movement of the underwater robot with the forward distance; or
in response to that a distance between the target position and the tracking target is less than or equal to the forward distance, controlling the underwater robot to move with the target position.

In an embodiment, the operation of controlling the underwater robot based on the received control instruction and the control coordinate system includes:
determining an obstacle-avoidance distance between the underwater robot and an obstacle;
determining the target position of the movement of the underwater robot according to the control coordinate system and the control instruction, and determining a separation distance between the underwater robot and the obstacle according to the target position;
in response to that the separation distance is greater than or equal to the obstacle-avoidance distance, controlling the movement of the underwater robot with the control instruction; or
in response to that the separation distance is less than the obstacle-avoidance distance, controlling the underwater robot to move with the obstacle-avoidance distance.

In an embodiment, the operation of controlling the underwater robot based on the received control instruction and the control coordinate system includes:
determining a target moving direction of the underwater robot according to the control instruction and the control coordinate system;
obtaining a water flow direction and a water flow speed in a water area where the underwater robot is located;

determining a moving direction and driving power of the underwater robot according to the target moving direction, the water flow direction and the water flow speed; and controlling the movement of the underwater robot according to the moving direction and the driving power.

In an embodiment, before the operation of controlling the underwater robot based on the received control instruction and the control coordinate system, the method further includes:

obtaining a water flow direction and a water flow speed in a water area where the underwater robot is located;

generating a working environment demonstration animation according to the control coordinate system, the water flow direction and the water flow speed; and displaying the working environment demonstration animation on the control terminal.

Besides, in order to achieve the above objective, the present disclosure further provides an underwater robot, the underwater robot includes a memory, a processor, and a program for controlling the underwater robot stored in the memory and operable on the processor, when the program for controlling the underwater robot is executed by the processor, the above-mentioned method for controlling the underwater robot is implemented.

Besides, in order to achieve the above objective, the present disclosure further provides a computer readable storage medium, a program for controlling an underwater robot is stored in the non-transitory computer readable storage medium, and when the program for controlling the underwater robot is executed by a processor, the above-mentioned method for controlling the underwater robot is implemented.

The present disclosure provides a method for controlling an underwater robot, an underwater robot and a storage medium. The method includes: in response to switching a display visual angle of a control terminal, determining an orientation of a current display visual angle relative to a controlled underwater robot; determining a current control coordinate system of the underwater robot according to the orientation, wherein a main direction of the control coordinate system is consistent with the orientation; and controlling the underwater robot based on a received control instruction and the control coordinate system. In this way, when the display visual angle is switched, the control coordinate system is correspondingly changed, so that the main direction of the control coordinate system is consistent with the orientation of the current visual angle and the controlled underwater equipment robot, which realizes controlling the underwater robot in a first-person perspective according to the current display visual angle, and makes the operation instruction correspond to the movement of the underwater robot, thereby reducing the difficulty of operating the underwater robot and improving the working efficiency.

The realization of the objective, functional characteristics, and advantages of the present disclosure are further described with reference to the accompanying drawings.

DETAILED DESCRIPTION OF THE EMBODIMENTS

It should be understood that the specific embodiments described here are only used to explain but not to limit the present disclosure.

In related underwater robot control solutions, the underwater robot is generally controlled from a first-person perspective based on the data captured by the main camera installed in front of the underwater robot. However, since the operator will switch cameras when observing the target on the side of the underwater robot, the image of the display visual angle is not the data captured by the main camera. Especially in the anti-flow operation scene, it will be more difficult to operate the underwater robot, thus the misoperation occurs, and the working efficiency is reduced.

In order to reduce the difficulty of operating an underwater robot, the embodiments of the present disclosure provide a method for controlling an underwater robot, an underwater robot, and a computer readable storage medium. The main operations of the method include:

in response to switching a display visual angle of a control terminal, determining an orientation of a current display visual angle relative to a controlled underwater robot;

determining a current control coordinate system of the underwater robot according to the orientation, a main direction of the control coordinate system being consistent with the orientation; and controlling the underwater robot based on a received control instruction and the control coordinate system.

In this way, when the display visual angle is switched, the control coordinate system is correspondingly changed, so that the main direction of the control coordinate system is consistent with the orientation of the current visual angle and the controlled underwater equipment robot, which realizes controlling the underwater robot in a first-person perspective according to the current display visual angle, and makes the operation instruction correspond to the movement of the underwater robot, thereby reducing the difficulty of operating the underwater robot and improving the working efficiency.

The content claimed by the claims of the present disclosure will be described in detail below in conjunction with the accompanying drawings.

Figure 1:
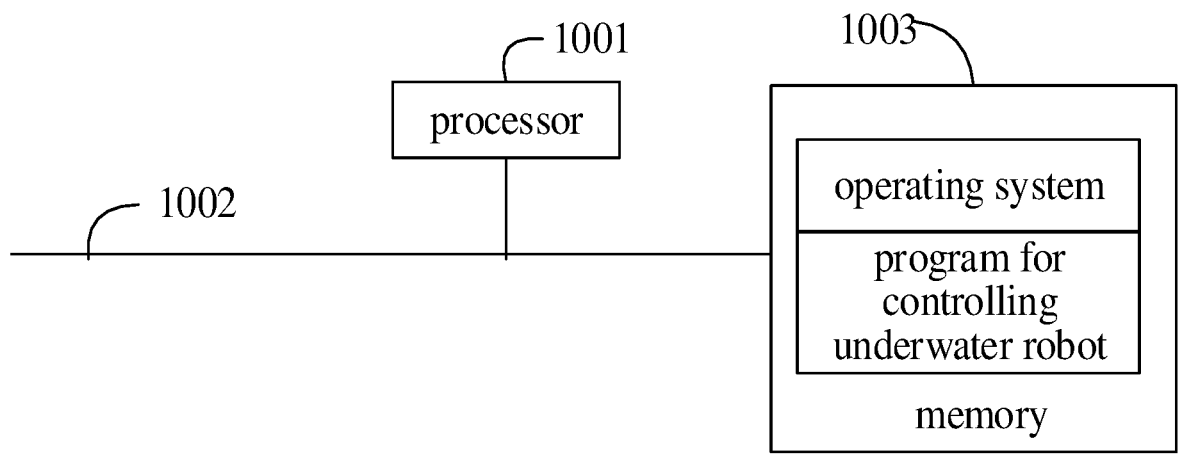
FIG. 1 is a schematic structural diagram of a terminal in a hardware operation environment according to an embodiment of the present disclosure.

As shown in FIG. 1, FIG. 1 is a structural diagram of a terminal in a hardware operation environment according to an embodiment of the present disclosure.

The terminal in the embodiments of the present disclosure may be an underwater robot or a terminal for controlling an underwater robot.

As shown in FIG. 1, the terminal may include: a processor 1001, such as a CPU, a memory 1003, and a communication bus 1002. The communication bus 1002 is configured to realize connection and communication between these assemblies. The memory 1003 may be a high-speed random access memory (RAM), or a stable memory (non-volatile memory), such as a disk memory. In an embodiment, the memory 1003 may also be a storage device independent of the foregoing processor 1001.

Those skilled in the art can understand that the terminal structure shown in FIG. 1 does not constitute a limitation on the terminal, and may include more or less components than those shown in the figure, or combine some components, or include different component arrangement.

As shown in FIG. 1, the memory 1003 as a computer storage medium may include an operating system and a program for controlling an underwater robot.

In the terminal shown in FIG. 1, the processor 1001 can call the program for controlling the underwater robot stored in the memory 1003, and perform the following operations:
- in response to switching a display visual angle of a control terminal, determining an orientation of a current display visual angle relative to a controlled underwater robot;
- determining a current control coordinate system of the underwater robot according to the orientation, a main direction of the control coordinate system being consistent with the orientation; and
- controlling the underwater robot based on a received control instruction and the control coordinate system.

Further, the processor 1001 can call the program for controlling the underwater robot stored in the memory 1003, and also perform the following operations:
- determining a camera corresponding to the current display visual angle;
- if the camera is fixedly installed, obtaining an installation position of the camera on the underwater robot; and
- determining the orientation according to the installation position.

Further, the processor 1001 can call the program for controlling the underwater robot stored in the memory 1003, and also perform the following operations:
- determining the camera corresponding to the current display visual angle;
- if the camera is installed on a support assembly, obtaining an angle information of the support assembly corresponding to the camera; and
- determining the orientation according to the angle information.

Further, the processor 1001 can call the program for controlling the underwater robot stored in the memory 1003, and also perform the following operations:
- determining a display mode corresponding to the current display visual angle;
- adjusting a body posture of the underwater robot according to the display mode; and
- determining the control coordinate system according to the body posture and the orientation.

Further, the processor 1001 can call the program for controlling the underwater robot stored in the memory 1003, and also perform the following operations:
- in response to receiving a target locking instruction, determining a forward distance between the underwater robot and a tracking target according to the target locking instruction;
- determining a target position of the movement of the underwater robot according to the control coordinate system and the control instruction;
- in response to that a distance between the target position and the tracking target is greater than the forward distance, controlling the movement of the underwater robot with the forward distance; and
- in response to that the distance between the target position and the tracking target is less than or equal to the forward distance, controlling the underwater robot with the target position.

Further, the processor 1001 can call the program for controlling the underwater robot stored in the memory 1003, and also perform the following operations:
- determining an obstacle-avoidance distance between the underwater robot and an obstacle;
- determining the target position of the movement of the underwater robot according to the control coordinate system and the control instruction, and determining a separation distance between the underwater robot and the obstacle according to the target position;
- in response to that the separation distance is greater than or equal to the obstacle-avoidance distance, controlling the movement of the underwater robot with the control instruction; and
- in response to that the separation distance is less than the obstacle-avoidance distance, controlling the underwater robot with the obstacle-avoidance distance.

Further, the processor 1001 can call the program for controlling the underwater robot stored in the memory 1003, and also perform the following operations:
- determining a target moving direction of the underwater robot according to the control instruction and the control coordinate system;
- obtaining a water flow direction and a water flow speed in the water area where the underwater robot is located;
- determining a moving direction and driving power of the underwater robot according to the target moving direction, the water flow direction and the water flow speed; and
- controlling the movement of the underwater robot according to the moving direction and the driving power.

Further, the processor 1001 can call the program for controlling the underwater robot stored in the memory 1003, and also perform the following operations:
- obtaining the water flow direction and the water flow speed in the water area where the underwater robot is located;
- generating a working environment demonstration animation according to the control coordinate system, the water flow direction and the water flow speed; and
- displaying the working environment demonstration animation on the control terminal.

In the following, the contents of the claims of the present disclosure are explained through specific exemplary solutions, so that those skilled in the art can better understand the protection scope of the claims of the present disclosure. It can be understood that the following exemplary solutions do not limit the protection scope of the present disclosure, but are only used to explain the present disclosure.

Figure 2:
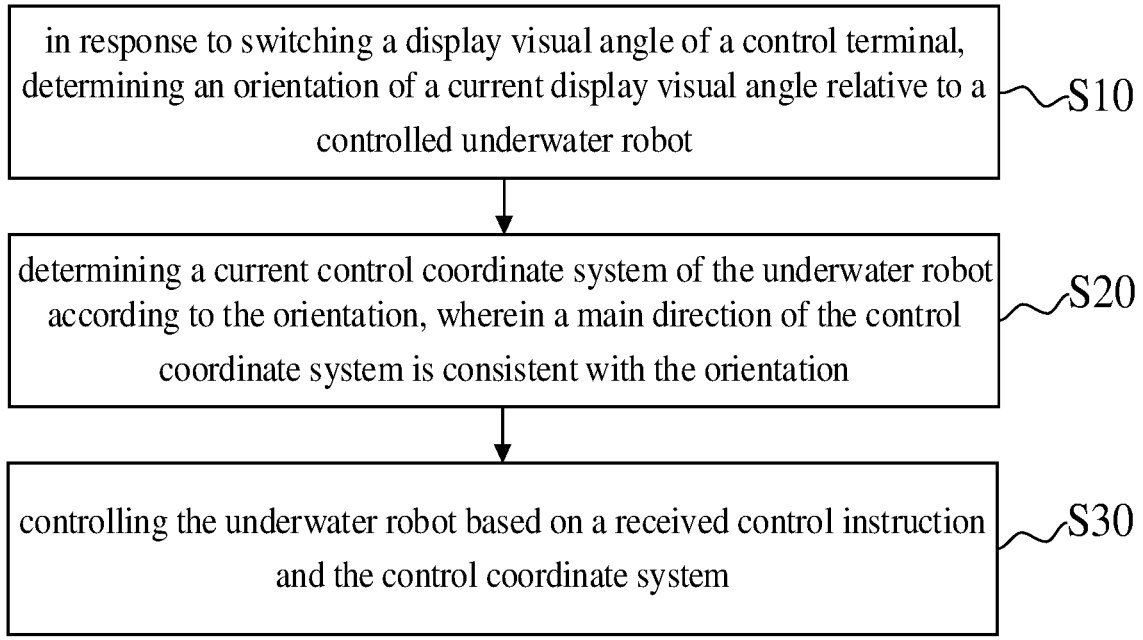
FIG. 2 is a schematic flowchart of a method for controlling an underwater robot according to an embodiment of the present disclosure.

Exemplarily, as shown in FIG. 2, in an embodiment of the present disclosure, the method for controlling the underwater robot includes the following operations:

Operation S10, in response to switching a display visual angle of a control terminal, determining an orientation of a current display visual angle relative to a controlled underwater robot.

In this embodiment, the subject that executes the method for controlling the underwater robot may be an underwater robot, or a control terminal of the underwater robot. The control terminal establishes a communication connection with the underwater robot. Based on the communication connection, the control terminal can send the control instruction triggered by the operator to the underwater robot. After receiving the control instruction, the underwater robot can perform corresponding actions. The control instructions may be a variety of instructions for controlling the movement of the robot, including but not limited to, a moving-control instruction, a body posture-adjusting instruction, etc., when receiving the control instruction, the underwater robot will move or adjust the body posture accordingly. For example, when receiving a forward moving-control instruction, the underwater robot moves forward; when receiving an instruction for rotating 180 degrees, the underwater robot rotates 180 degrees.

The control terminal also includes a display screen, which can display images captured by the camera of the underwater robot and is used to display the underwater environment, so that the operator can operate the underwater robot according to the underwater environment.

The camera of the underwater robot may include one or more cameras, including but not limited to, optical camera, and acoustic camera, etc., which may shoot in different directions relative to the controlled underwater robot, and obtain display pictures of different shooting visual angles. The display visual angle of the control terminal is the shooting visual angle of the camera that captures the corresponding display picture.

The display visual angle switching of the control terminal can be triggered by the operator after triggering the display visual angle switching instruction, or it can be triggered automatically. For example, when the radar device determines that objects such as movement and preset tracking target appear in other orientations other than the orientation of the current display visual angle relative to the controlled underwater robot, it can automatically switch to the display visual angle corresponding to the object. The switching instruction may include the instruction corresponding to switching the camera for shooting the display picture, which is equivalent to the operator directly switching the camera for shooting the display picture. The switching instruction may also include an instruction corresponding to switching the shooting direction of the camera, which is equivalent to the operator adjusting the shooting direction of the camera for shooting the display picture, such as changing the shooting direction of the camera by adjusting a pan/tilt/zoom (PTZ). The switching instruction may also include an instruction to switch the display picture of the target display area in the display screen, etc.

It needs to be added that the display visual angle is also the shooting visual angle corresponding to the display screen that the operator is most concerned about. In some embodiments, the display area of the display screen only displays the display picture captured by one camera. The only display area is the target display area, and the shooting visual angle corresponding to this display picture is the display visual angle. In other embodiments, the display screen may be divided into multiple display areas, which may respectively display the images of different shooting visual angles of view. It is considered that the display area that the operator pays most attention to is the target display area, and the target display area may be the largest display area, the frontmost display area, or a preset display area by the operator. When an instruction to switch the display picture of the target display area is received, it is determined whether the shooting visual angle corresponding to the switched display picture is switched, and if switched, then the corresponding determined display visual angle is switched, for example, the display picture in the target display area is switched to other display picture of the display area, and the shooting visual angle corresponding to the display picture of other display areas is different from the shooting visual angle of the target display area before switching. If not switched, the display visual angle is determined to be switched accordingly. For example, the display picture in the target display area is switched to the display picture in other display areas, and the display picture in other display areas is an enlarged partial view of the display picture in the target display area, and the two shooting visual angles are the same.

For a better understanding, a specific embodiment is provided: the display screen of the control terminal includes the largest display area 1, and other display areas 2, 3, and 4, among which the display area 1 is the target display area, which is the display area that the operator pays most attention to. Display areas 1, 2, 3, and 4 currently display the display pictures a, b, c, and d captured by cameras A, B, C, and D installed on the front, rear, left, and right of the underwater robot respectively. If the operator wants to observe the underwater environment on the left side of the underwater robot, it is necessary to switch the left display picture c to display area 1. The operator can click display area 3 to trigger the display picture switching instruction between display area 3 and display area 1, so that the display picture of display area 1 is switched to the display picture c, and the display picture of the display area 3 is switched to the display picture a. Therefore, it is determined that the display picture of the target display area is switched and the corresponding shooting visual angle is also switched, and then it is determined that the display visual angle of the control terminal is switched.

In an embodiment, there are many ways to trigger the switching of the display visual angle of the control terminal, but the final result is that the display picture in the target display area is switched. Therefore, it can be detected whether the shooting visual angle corresponding to the display picture in the target display area is switched. When switching occurs, determine the orientation of the current display visual angle relative to the controlled underwater robot, thereby simplifying the program flow.

When the display visual angle of the display screen of the control terminal is switched, the current display visual angle may be determined according to the shooting visual angle corresponding to the current display picture of the target display area, or may be determined according to the corresponding shooting visual angle after switched by the switching instruction. The current display visual angle is the shooting visual angle of the camera that captures the display picture after switching. The underwater robot camera is used to capture the underwater environment, which starts from the underwater robot and captures the display picture radially to the outside environment. Therefore, the orientation can be determined according to the shooting visual angle corresponding to the current display visual angle. Specifically, the shooting visual angle can be fitted as a view frustum, and the axis of the view frustum is used as the orientation of the display visual angle relative to the controlled underwater robot.

Operation S20, determining a current control coordinate system of the underwater robot according to the orientation, wherein a main direction of the control coordinate system is consistent with the orientation.

In this embodiment, the current control coordinate system of the underwater robot is determined according to the orientation, the control coordinate system is the basis for the actual movement of the underwater robot, and the driving of the underwater robot moves according to the coordinate points in the control coordinate system. The control coordinate system is the coordinate system regards the center of the underwater robot or the center of the camera that captures the current display visual angle corresponding to the display picture as the origin. Each coordinate point on the control coordinate system corresponds to different moving control instructions, and the target moving direction and/or the target moving distance of the different moving control instructions is different, the control coordinate system includes multiple axes, the direction of each axis corresponds to the target moving direction of the control instruction, each axis further corresponds to different body posture adjusting control instructions, the target rotation angle and the target rotation direction corresponding to the different body posture adjusting control instructions are different. The axial direction of each axis corresponds to a target rotation direction corresponding to the different body posture adjusting control instruction, and the direction corresponding to one axis is the main direction of the control coordinate system, which is also the main target moving direction of the control instruction. Generally, the control coordinate system includes three mutually perpendicular axes, and the three target moving directions corresponding to the three axes are also perpendicular to each other. The target moving direction corresponding to the control instruction for controlling moving forward is forward, and the controlling forward is used as the main target moving direction, and the axis direction corresponding to the control instruction for controlling forward movement is the main direction of the control coordinate line. When determining the control coordinate system, the main direction of the control coordinate system is provided to be consistent with the orientation of the current display visual angle relative to the controlled underwater robot, that is, the axis of the current display visual angle corresponding to the shooting visual angle is taken as the axis direction corresponding to the main direction of the control coordinate system.

Figure 4:
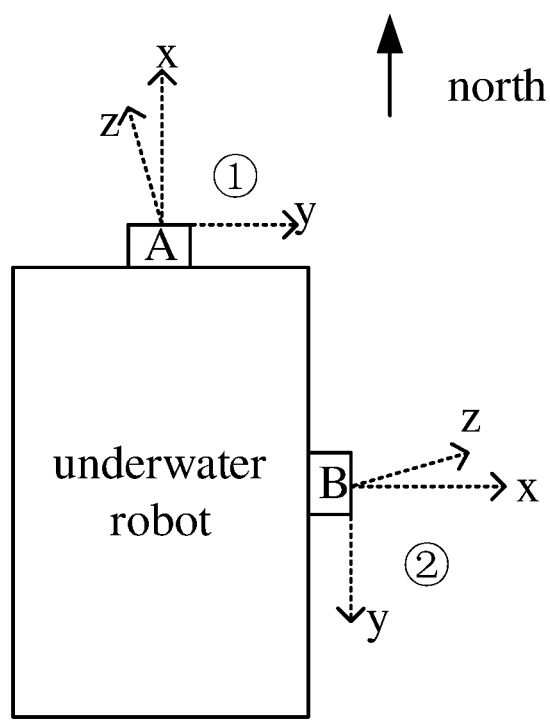
FIG. 4 is a schematic view of control coordinate switching according to an embodiment of the present disclosure.

For a better understanding, as shown in FIG. 4, the underwater robot includes two cameras A and B whose axes of shooting visual angle are perpendicular to each other. When the display visual angle of the control terminal is switched from A to B, the control coordinate system is switched from ① to ②, where the axis corresponding to the control instruction for controlling forward is x, and the direction of the axis corresponding to x is the main direction of the control coordinate system. When the control coordinate system is ①, the underwater robot will move northward when receiving the control instruction for moving forward. When the control coordinate system is ②, the underwater robot will move eastward when receiving the control instruction for moving forward.

Operation S30, controlling a movement of the underwater robot based on a received control instruction and the control coordinate system.

In this embodiment, when a control instruction is received, the target control direction and the target moving distance or the target rotation angle or the target rotation direction corresponding to the control instruction are determined, the target moving direction and the target moving distance or the target rotation angle or the target rotation direction are mapped to the control coordinate system, and the corresponding coordinate points or the rotation axes are found.

The underwater robot moves according to the corresponding coordinate points, and performs the body posture adjustment that comply with the or the target rotation angle or the target rotation direction according to the corresponding rotation axis. If the control coordinate system is different, the same coordinate point or the rotation axis will correspond to different movement results, and the control coordinate system may correspond to the current display visual angle, so that the operator may control the underwater robot with the seen first-person visual angle, which reduces the difficulty of control.

In the technical solution of this embodiment, in response to that a display visual angle of view of a control terminal is switched, determining an orientation of a current display visual angle of view relative to a controlled underwater robot; determining a current control coordinate system of the underwater robot according to the orientation, wherein a main direction of the control coordinate system is consistent with the orientation; and controlling the underwater robot based on a received control instruction and the control coordinate system. In this way, when the display visual angle is switched, the control coordinate system is correspondingly changed, so that the main direction of the control coordinate system is consistent with the orientation of the current visual angle and the controlled underwater equipment robot, which realizes controlling the underwater robot in a first-person perspective according to the current display visual angle, and makes the operation instruction correspond to the movement of the underwater robot. In the working scene of the underwater robot, especially in the anti-flow scene where the operator is required to operate in real time, and other scenes where there is not enough time for the operator to react, it is very important to use the current display visual angle as the first-person perspective, thereby reducing the difficulty of operating the underwater robot and improving the working efficiency.

Further, the operation S10 includes:
determining a camera corresponding to the current display visual angle of view;
if the camera is fixedly installed, obtaining an installation position of the camera on the underwater robot; and
determining the orientation according to the installation position.

First, make sure that the camera that captures the display picture of the current display visual angle is the camera corresponding to the current display visual angle. The camera can be fixedly installed on the underwater robot. If the camera corresponding to the current display visual angle is fixed on the underwater robot, the relative positions of the two will not change, and the shooting visual angle will also not change. The installation position of the fixedly installed camera can be determined through pre-stored methods, etc., and then determine its shooting visual angle according to the installation position of the camera that captures the display picture in the current display visual angle, and then determine the current display visual angle relative to in the position of the controlled underwater robot. There is still a certain risk of operational difficulty during the interval of switching the control coordinate system, so that the orientation can be quickly determined, the time for switching the control coordinate system can be reduced, the operation difficulty of the underwater robot can be lowered, and the operation efficiency can be improved.

Further, the operation S10 includes:
determining the camera corresponding to the current display angle of view;
if the camera is not fixedly installed, obtaining an angle information of a support assembly corresponding to the camera; and
determining the orientation according to the angle information.

The camera can be an underwater robot that is not fixedly installed, and can be connected to the underwater robot through a support assembly, such as a horizontal PTZ, a vertical PTZ, a multi-axis PTZ. By changing the angle of the support assembly, the relative position of the camera and the underwater robot may be changed, and the shooting visual angle will be changed with the support assembly. The current angle information of the support assembly may be combined with the relative positional relationship between the support assembly and the camera and the underwater robot respectively, to determine the shooting visual angle of the camera that captures the display picture in the current display visual angle, thereby to determine the orientation of the current display visual angle relative to the controlled underwater robot. The angle information of the support assembly is the relative angle between each vector support element in the support assembly, and the angle information of the support assembly may also be the structural information of the support assembly. There is still a certain risk of operational difficulty during the interval between switching the control coordinate system, which may quickly determine the orientation and reduce the time for switching the control coordinate system. In addition, the adjustment of the support assembly may be synchronized with the control instruction, so that the two adjustments are consistent. Therefore, the operation difficulty of the underwater robot may be reduced, the operation efficiency may be improved, the cost of installing the camera may be saved by changing the shooting visual angle through the support assembly, and the diversity of shooting visual angles may also be increased.

Further, the operation S20 includes:
determining a display mode corresponding to the current display angle of view;
adjusting a body posture of the underwater robot according to the display mode; and
determining the control coordinate system according to the body posture and the orientation.

The display picture corresponding to the current display visual angle has multiple display modes on the display screen, and different display modes have different body postures of the underwater robot. Especially in order to capture the display picture that meets the display mode, the attitude of the underwater robot to capture the display picture is not the same, such as a portrait mode, a landscape mode, etc., and the frame size of the display picture captured by the camera is generally fixed. Therefore, in order to make the captured display pictures more suitable for the display mode, the body posture in the portrait mode is vertical, and the body posture in the landscape mode is horizontal. For another example, when the operator turns on a partial enlarged mode of the display picture, it is required that the body should not shake to avoid instability of the partial picture, then the body posture may be posture such as slightly inclined that may buffer the pressure of the water flow. If the body posture is different, the corresponding control coordinate system may also need to be changed. Therefore, after adjusting the body posture according to the display mode, the control coordinate system needs to be determined according to the current posture and orientation of the body.

For a better understanding, a specific application scene is combined to illustrate. The underwater photographing is generally needed in the underwater working, since the camera is commonly horizontal, when the underwater robot moves in a horizontal posture, it can only take horizontal pictures. If a portrait photo is needed, it is necessary to crop on the basis of the horizontal picture, but this will lead to a decrease in the photo quality. When the operator needs to take a vertical picture, the display mode of the control terminal will also be adjusted to the portrait mode for a preview effect. Therefore, according to the current display mode of the control-terminal screen, the posture of the body is adjusted to the vertical state to obtain a high-quality longitudinal picture, while adjusting the control coordinate system to reduce the difficulty of operation.

This makes it possible to control the coordinate system while changing the body posture through the display mode, so that the underwater robot may still be controlled from the operator's first-person perspective, and the display mode may be changed according to the demand, making it more in line with the operator's operating needs, Reducing the operating difficulty of the operator and improving the efficiency of underwater operations.

Further, the operation S30 includes:
in response to receiving a target locking instruction, determining a forward distance between the underwater robot and a tracking target according to the target locking instruction;
determining a target position of the movement of the underwater robot according to the control coordinate system and the control instruction;
in response to that a distance between the target position and the tracking target is greater than the forward distance, controlling the movement of the underwater robot with the forward distance; and
in response to that the distance between the target position and the tracking target is less than or equal to the forward distance, controlling the underwater robot to move with the target position.

In this embodiment, the target tracking mode may be started according to the target locking instruction, that is, move within a certain range from the tracking target. When the target locking instruction is received, the forward distance between the underwater robot and the tracking target is determined according to the target locking instruction, the forward distance is the maximum distance threshold between the underwater robot and the tracking target, and the distance between the underwater robot and the tracking target cannot exceed the forward distance in order to realize the tracking of the target. Determine the target moving direction and target moving distance of the underwater robot according to the control coordinate system and control instruction, and determine the target position according to the target moving direction and target moving distance. When the distance between the target position and the tracking target is greater than the forward distance, use the target moving direction as the actual moving direction of the robot, and use the forward distance as the final actual distance between the underwater robot and the tracking target to control the movement of the underwater robot. When the distance between the target position and the tracking target is less than or equal to the forward distance, the underwater robot may be controlled to move by the control instruction directly. The underwater robot may also measure the distance between itself and the tracking target in real time through multi-beam sonar or single-beam sonar. When the distance is greater than the forward distance, the underwater robot may be controlled to move according to the difference between the real-time measured distance and the forward distance.

This can ensure that the underwater robot always moves within the forward distance of the tracking target, reduces the difficulty of target tracking and moving the underwater robot for the operator, and improves the working efficiency.

Further, the operation S30 includes:
- determining an obstacle-avoidance distance between the underwater robot and an obstacle;
- determining the target position of the movement of the underwater robot according to the control coordinate system and the control instruction, and determining a separation distance between the underwater robot and the obstacle according to the target position;
- in response to that the separation distance is greater than or equal to the obstacle-avoidance distance, controlling the movement of the underwater robot with the control instruction; and
- in response to that the separation distance is less than the obstacle-avoidance distance, controlling the underwater robot to move with the obstacle-avoidance distance.

In this embodiment, the obstacle-avoidance mode can be started, that is, after the obstacle is determined, the robot moves outside a certain range from the obstacle. When receiving the start instruction of the obstacle-avoidance mode, determine whether there is an obstacle nearby; when determining the position of the obstacle, determine the obstacle-avoidance distance between the underwater robot and the obstacle set in the obstacle-avoidance mode. The distance between the underwater robot and the obstacle cannot be less than the obstacle-avoidance distance to achieve obstacle-avoidance. The target position of the movement of the underwater robot is determined according to the control coordinate system and the control instruction, and the separation distance between the robot and the obstacle is determined according to the target position; when the separation distance is greater than or equal to the obstacle-avoidance distance, the control instruction is used to control the movement of the underwater robot; when the separation distance is less than the obstacle-avoidance distance, the underwater robot is controlled with the obstacle-avoidance distance. This can ensure that the underwater robot always moves outside the obstacle-avoidance range corresponding to the obstacle, reduces the difficulty of avoiding obstacles and moving the underwater robot for the operator, and improves the working efficiency.

Figure 3:
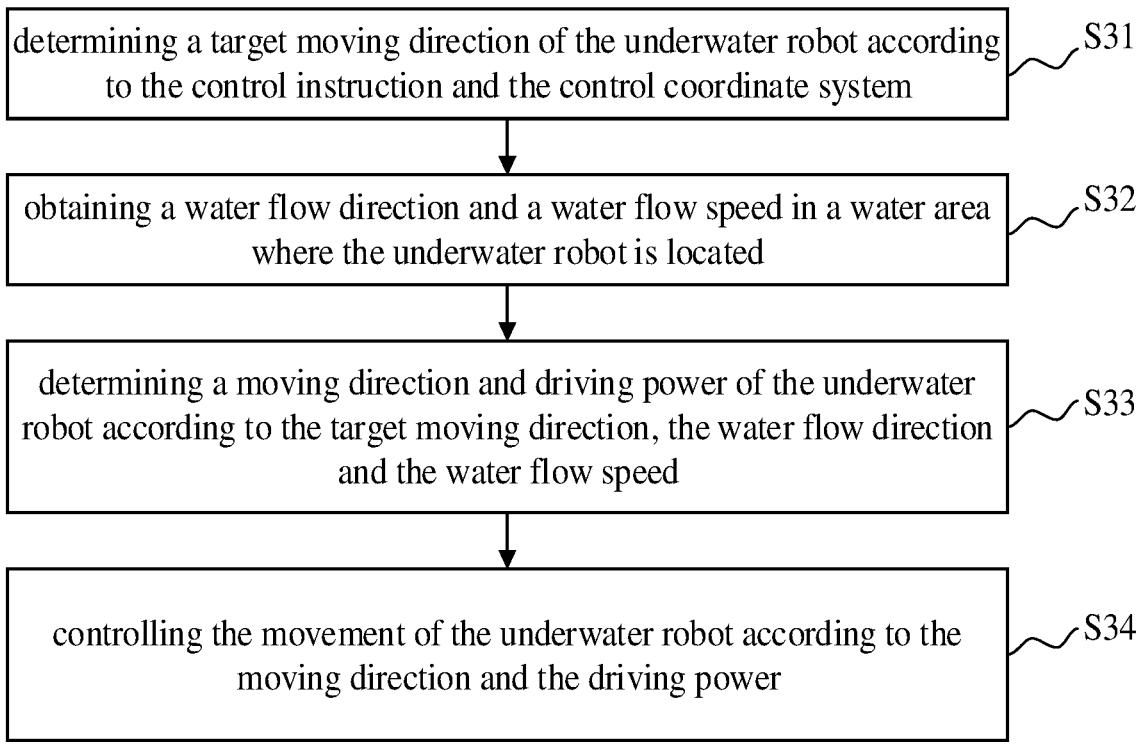
FIG. 3 is a schematic flowchart of the method for controlling the underwater robot according to another embodiment of the present disclosure.

As shown in FIG. 3, based on any of the above-mentioned embodiments, in another embodiment of the present disclosure, the operation S30 includes:
- operation S31, determining a target moving direction of the underwater robot according to the control instruction and the control coordinate system;
- operation S32, obtaining a water flow direction and a water flow speed in the water area where the underwater robot is located;
- operation S33, determining a moving direction and driving power of the underwater robot according to the target moving direction, the water flow direction and the water flow speed;
- operation S34, controlling the movement of the underwater robot according to the moving direction and the driving power.

In this embodiment, due to the presence of a certain momentum in the water flow, the movement trajectory of the underwater robot will be changed, so that the actual moving direction of the underwater robot is not the movement path expected by the operator, and the controllability of the underwater robot for the operator is reduced. Therefore, after the target moving direction of the underwater robot is determined through the control instruction and the control coordinate system, obtain the water flow direction and the water flow speed in the water area where the underwater robot is located, correspondingly determine that the effect of water flow may be counteracted by the water flow direction, water flow speed and the target moving direction, and the actual movement of the robot may be kept in the target moving direction. As for the moving direction and the driving power, the moving direction is the moving direction of the control robot, the driving power may represent the moving power provided to the underwater robot, the underwater robot is controlled to move according to the moving direction and the driving power.

In the technical solution of this embodiment, by obtaining the water flow speed and the water flow direction, the moving direction and the driving power that may counteract the effect of the water flow are calculated to control the movement of the robot, so that the actual moving direction of the underwater robot is consistent with the target moving direction expected by the operator, thereby improving the controllability of the operator to the underwater robot, reducing the difficulty of operation, and improving the operation efficiency.

Based on any of the above-mentioned embodiments, in another embodiment of the present disclosure, before operation S30, the method further includes:
- obtaining the water flow direction and the water flow speed in the water area where the underwater robot is located;
- generating a working environment demonstration animation according to the orientation, the water flow direction and the water flow speed; and
- displaying the working environment demonstration animation on the control terminal.

Figure 5:
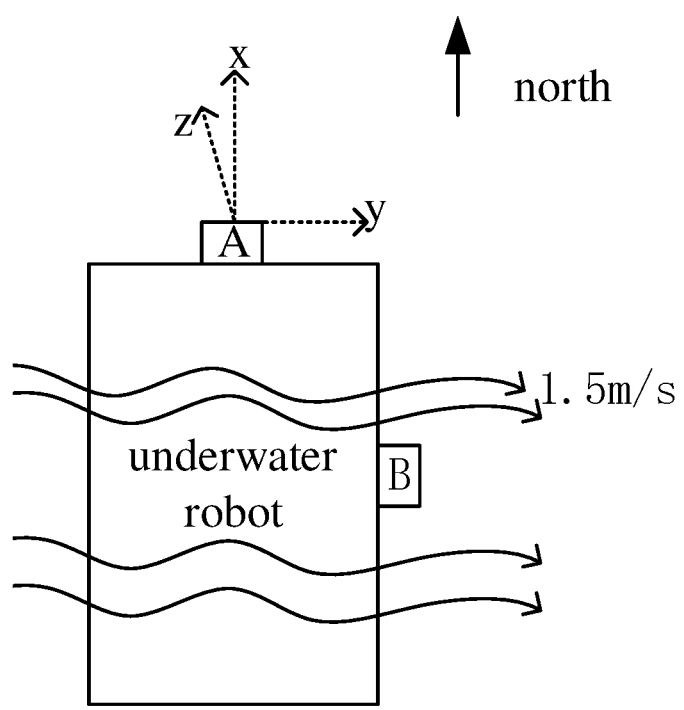
FIG. 5 is a schematic view of a working environment demonstration animation according to an embodiment of the present disclosure.

In this embodiment, as shown in FIG. 5, the method includes: obtaining the water flow direction and the water flow speed of the water area where the underwater robot is located, and generating the operation environment demonstration animation according to the current display visual angle relative to the current control coordinate system, water flow direction and water flow speed of the controlled underwater robot. The demonstration animation can show the effect of water flow, and the current first-person control perspective of the underwater robot. The demonstration animation of the working environment may be displayed on the control terminal, and the demonstration animation of the working environment may be superimposed and displayed on the display picture corresponding to the current display visual angle, so that the operator may view the display picture and the working environment demonstration animation simultaneously, and know the condition of the water flow. This makes it convenient for the operator to actively counteract the effect of the water flow during operation, makes it easier to achieve the purpose of operation, reduce the difficulty of operation, and improve the working efficiency.

In addition, the present disclosure also provides an underwater robot, which includes a memory, a processor, and a program for controlling the underwater robot stored in the memory and operable on the processor. When the program for controlling the underwater robot is executed by the processor, the operations of the method for controlling the underwater robot described in the above embodiments are implemented.

In addition, the present disclosure also provides a non-transitory computer readable storage medium, the program for controlling an underwater robot is stored in the non-transitory computer readable storage medium, and when the program for controlling the underwater robot is executed by the processor, the above operations of the method for controlling the underwater robot described in the embodiment.

It should be noted that, as used herein, the term "comprise", "comprises" or any other variation thereof is intended to cover a non-exclusive inclusion such that a process, method, article or system comprising a set of elements includes not only those elements, it also includes other elements not expressly listed, or elements inherent in the process, method, article, or system. Without further limitations, an element defined by the phrase "comprising a . . ." does not preclude the presence of additional identical elements in the process, method, article or system comprising that element.

The serial numbers of the above embodiments of the present disclosure are for description only, and do not represent the advantages and disadvantages of the embodiments.

Through the description of the above embodiments, those skilled in the art can clearly understand that the methods of the above embodiments can be implemented by means of software plus a necessary general-purpose hardware platform, and of course also by hardware, but in many cases the former is better implementation. Based on such an understanding, the technical solution of the present disclosure can be embodied in the form of a software product in essence or in other words, the part that contributes to the prior art, and the computer software product is stored in a storage medium (such as ROM/RAM) as described above., magnetic disk, optical disk), including several instructions to make the underwater robot or the control terminal corresponding to the underwater robot execute the methods described in various embodiments of the present disclosure.

The above are only some embodiments of the present disclosure, and do not limit the scope of the present disclosure thereto. Under the inventive concept of the present disclosure, equivalent structural transformations made according to the description and drawings of the present disclosure, or direct/indirect application in other related technical fields are included in the scope of the present disclosure.

What is claimed is:

1. A method for controlling an underwater robot, comprising:
    in response to switching a display visual angle of a control terminal, determining an orientation of a current display visual angle relative to a controlled underwater robot;
    determining a current control coordinate system of the underwater robot according to the orientation, wherein a main direction of the control coordinate system is consistent with the orientation;
    controlling the underwater robot based on a received control instruction and the control coordinate system;
    wherein the controlling the underwater robot based on the received control instruction and the control coordinate system comprises:
    in response to receiving a control instruction, determining a target rotation angle or a target rotation direction corresponding to the control instruction;
    mapping the target rotation angle or the target rotation direction to the control coordinate system; and
    determining corresponding rotation axes so that the underwater robot performs body posture adjustment that complies with the target rotation angle or the target rotation direction according to the corresponding rotation axes.

2. The method of claim 1, wherein the determining the orientation of the current display visual angle relative to the controlled underwater robot comprises:
    determining a camera corresponding to the current display visual angle;
    if the camera is fixedly installed, obtaining an installation position of the camera on the underwater robot; and
    determining the orientation according to the installation position.

3. The method of claim 1, wherein the determining the orientation of the current display visual angle relative to the controlled underwater robot comprises:
    determining a camera corresponding to the current display visual angle;
    if the camera is installed on a support assembly, obtaining an angle information of the support assembly; and
    determining the orientation according to the angle information.

4. The method of claim 1, wherein the determining the current control coordinate system of the underwater robot according to the orientation comprises:
    determining a display mode corresponding to the current display visual angle;
    adjusting a body posture of the underwater robot according to the display mode; and
    determining the control coordinate system according to the body posture and the orientation.

5. The method of claim 1, wherein the controlling the underwater robot based on the received control instruction and the control coordinate system comprises:
    in response to receiving a target locking instruction, determining a forward distance between the underwater robot and a tracking target according to the target locking instruction;
    determining a target position of a movement of the underwater robot according to the control coordinate system and the control instruction; and
    in response to that a distance between the target position and the tracking target is greater than the forward distance, controlling the movement of the underwater robot with the forward distance; or
    in response to that a distance between the target position and the tracking target is less than or equal to the forward distance, controlling the underwater robot to move with the target position.

6. The method of claim 1, wherein the controlling the underwater robot based on the received control instruction and the control coordinate system comprises:
    determining an obstacle-avoidance distance between the underwater robot and an obstacle;
    determining the target position of the movement of the underwater robot according to the control coordinate system and the control instruction, and determining a separation distance between the underwater robot and the obstacle according to the target position; and
    in response to that the separation distance is greater than or equal to the obstacle-avoidance distance, controlling the movement of the underwater robot with the control instruction; or
    in response to that the separation distance is less than the obstacle-avoidance distance, controlling the underwater robot to move with the obstacle-avoidance distance.

7. The method of claim 1, wherein the controlling the underwater robot based on the received control instruction and the control coordinate system comprises:

determining a target moving direction of the underwater robot according to the control instruction and the control coordinate system;

obtaining a water flow direction and a water flow speed in a water area where the underwater robot is located;

determining a moving direction and driving power of the underwater robot according to the target moving direction, the water flow direction and the water flow speed; and controlling the movement of the underwater robot according to the moving direction and the driving power.

8. The method of claim 1, wherein before the controlling the underwater robot based on the received control instruction and the control coordinate system, the method further comprises:

obtaining the water flow direction and the water flow speed in the water area where the underwater robot is located;

generating a working environment demonstration animation according to the control coordinate system, the water flow direction and the water flow speed; and displaying the working environment demonstration animation on the control terminal.

9. An underwater robot, comprising:

a memory;

a processor; and a program for controlling the underwater robot stored in the memory and operable on the processor, wherein when the program for controlling the underwater robot is executed by the processor, the method for controlling the underwater robot of claim 1 is implemented.

10. A non-transitory computer readable storage medium, wherein a program for controlling an underwater robot is stored in the non-transitory computer readable storage medium, and when the program for controlling the underwater robot is executed by a processor, the method for controlling the underwater robot of claim 1 is implemented.

* * * * *